United States Patent
Ho et al.

(10) Patent No.: US 10,303,339 B2
(45) Date of Patent: May 28, 2019

(54) MULTI-INFORMATION DISPLAY SOFTWARE SWITCH STRATEGY

(71) Applicant: Toyota Motor Engineering & Manufacturing North America, Inc., Erlanger, KY (US)

(72) Inventors: Talia T. Ho, Ann Arbor, MI (US); Earnee J. Gilling, Ypsilanti, MI (US); Tomohiro Matsukawa, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 466 days.

(21) Appl. No.: 15/248,061

(22) Filed: Aug. 26, 2016

(65) Prior Publication Data

US 2018/0059905 A1 Mar. 1, 2018

(51) Int. Cl.
*G06F 3/033* (2013.01)
*G06F 3/0483* (2013.01)
*B60K 37/06* (2006.01)

(52) U.S. Cl.
CPC ............ *G06F 3/0483* (2013.01); *B60K 37/06* (2013.01); *B60K 2350/106* (2013.01); *B60K 2350/1016* (2013.01); *B60K 2350/1028* (2013.01); *B60K 2350/1096* (2013.01); *B60K 2350/352* (2013.01); *B60K 2350/967* (2013.01)

(58) Field of Classification Search
CPC ... B60Q 1/00; G06F 7/00; G06F 17/00; G06F 3/0487; G06F 3/033; B62D 6/00
See application file for complete search history.

(56) References Cited

U.S. PATENT DOCUMENTS

| 4,811,240 | A | 3/1989 | Ballou et al. | |
|---|---|---|---|---|
| 2006/0155441 | A1* | 7/2006 | Berg | B60K 35/00 701/41 |
| 2006/0224945 | A1 | 10/2006 | Khan et al. | |
| 2006/0227065 | A1 | 10/2006 | Yukawa et al. | |
| 2010/0256855 | A1* | 10/2010 | Hardy | B60K 37/06 701/31.4 |

(Continued)

FOREIGN PATENT DOCUMENTS

| WO | 03036455 A1 | 5/2003 |
|---|---|---|
| WO | 2008080448 A1 | 7/2008 |

*Primary Examiner* — Rashawn N Tillery
(74) *Attorney, Agent, or Firm* — Dinsmore & Shohl LLP (57) ABSTRACT

A vehicular human-machine interface, an instrument cluster and a method of providing information to a driver of a vehicle. The interface includes a multi-information display that provides a driver numerous dynamically-adjustable icons that are representative of a vehicle systems such that the driver can view, and if necessary, control through the interface. During use by a driver to navigate among the various icons being displayed, the human-machine interface enhances a driver's visual acuity by providing notorious indicia of the status of a particular vehicle system that may be of interest to the driver. In addition, by having certain information be arranged in a dynamic presentation format for selective viewing rather than arranged statically, certain information not of immediate interest can be temporarily removed, thereby freeing up the display to show a larger number of the icons on any particular screen being viewed.

20 Claims, 7 Drawing Sheets

(56) References Cited

U.S. PATENT DOCUMENTS

| | | | |
|---|---|---|---|
| 2010/0268426 A1* | 10/2010 | Pathak | G06F 3/03547 701/48 |
| 2010/0315376 A1 | 12/2010 | Choi | |
| 2011/0320088 A1* | 12/2011 | Eom | B60K 35/00 701/34.4 |
| 2014/0116179 A1* | 5/2014 | Sata | B60K 20/06 74/473.31 |
| 2014/0164932 A1* | 6/2014 | Takatsudo | G08G 1/096883 715/733 |
| 2016/0054821 A1* | 2/2016 | Kim | G06F 3/03545 345/179 |
| 2016/0259528 A1* | 9/2016 | Foss | G06F 3/0482 |
| 2016/0264054 A1* | 9/2016 | Uken | B60R 1/088 |
| 2017/0357425 A1* | 12/2017 | Smith | G05B 15/02 |
| 2018/0074687 A1* | 3/2018 | Ho | G06F 3/04847 |
| 2018/0091381 A1* | 3/2018 | McLaughlin | G06F 9/451 |

* cited by examiner

MULTI-INFORMATION DISPLAY SOFTWARE SWITCH STRATEGY

TECHNICAL FIELD

The present specification relates generally to a method and system for placing vehicle system information on a driver-oriented display, and more particularly the use of dynamic graphical images on the display to only show such information on an as-needed basis in order to reduce the visual complexity of images depicted on the display.

BACKGROUND

One type of display commonly found in motor vehicles is known as a multi-information display (MID), where various systems may be visually represented by screen-based graphical-user interface (GUI) icons that when activated provide access to software that permits a user retrieve programs and related information pertaining to the vehicular system. MIDs can be used to provide visual cues to the driver of information related to the various vehicular systems (also referred to herein as vehicle systems) that are available for monitoring access or manipulation. The display can be made to provide such information in menu-based formats so that the driver may toggle through various levels of screens through tactile input from various switches, buttons or the like in order to view or make adjustments to one or more operational parameters of the selected vehicular system.

In one known form, icons pertaining to a particular vehicular function (such as audio, navigation, climate, component monitoring and maintenance, telecommunications or the like) are placed on the MID in a sequential, interactive series of menu-based screens. In such a menu-driven format, various icons in a particular sub-menu help the user gain access to individual features within each of the broader functions of the corresponding menu. These icons in both a main menu and any sub-menu may be formed as dynamic elements that can be made to change in response to an input or related stimuli. As such, these icons may be formed as various so-called "soft switches" where their functions are unique to the screen being displayed. In this way, a relatively small number of hard switches (such as those mounted on the steering wheel) may be used such that depressing the same button on the hard switch can activate a different function, depending on the menu or sub-menu being displayed. While this overlap made possible by the use of soft switches helps to reduce the number of buttons or related hard switches, difficulties for the user remain.

In particular, MID screens have to compete with other displays (such as the aforementioned speedometer and tachometer) in somewhat limited amount of dashboard "real estate". Currently, there is only enough space for a limited number of icons to be displayed on a particular MID screen while avoiding driver eye fatigue and distraction. A particular part of the problem is due to extraneous information needed to provide the user with icon-identifying information, activation status information and the graphical image itself, as well as in some cases instructions related to how to access or customize a particular icon-based soft switch. This results in confusing presentation of the displayed images, which results in increased driver workload and reduced visual acuity.

Accordingly, a need exists for improved way to display images on a MID that simplifies both a driver's access to information being shown on the MID as well as control of vehicle systems that correspond to such displayed information.

SUMMARY

In one embodiment, a vehicular HMI is disclosed. The HMI includes a MID, a switch and a control unit such that upon receipt of a tactile input from a driver or other user of the HMI, various images that provide visual indicia representative of a vehicular system may be seen and (if desired) selected by the driver. In addition, once a particular icon is selected, the user may toggle among hierarchical menus and sub-menus in order to gain visual access to and, if desired, change one or more operational parameters associated with the selected vehicular system. The control unit is cooperative with the switch and display to navigate between the various icons on the display in response to a tactile input from the switch. In addition, the control unit includes control logic (such as that associated with algorithmic programming code or the like) that enhances the navigation, particularly as it relates to the way that the icons and their associated information is being presented to the driver on the display. In one portion of the control logic, such enhanced navigation includes providing indicia of the operational status of the vehicle systems that correspond to the displayed icons on the screen during navigation. In another portion of the control logic, such enhanced navigation includes providing highlighting indicia for a particular one of the displayed icons on the screen during navigation, where the particular one of the displayed icons corresponds to a respective vehicle system that the driver desires to receive information on. In yet another portion of the control logic, such enhanced navigation includes selectively providing, upon receipt of a first command from the switch, a change in operational status of the vehicle system that corresponds to the displayed icon. In yet another portion of the control logic, such enhanced navigation includes selectively providing, upon receipt of a respective second command from the switch that is different from the first command, one or more customization options for the vehicle system that corresponds to the displayed icon with the highlighting indicia. Such a customization option is evidenced by a second visual indicia on the display that replaces the first visual indicia for at least the duration of time associated with such customization.

In another embodiment, a vehicular instrument cluster is disclosed. The instrument cluster includes one or more gauges to provide visual indicia of an operational status of a vehicle, and a vehicular HMI that includes a switch, an MID and a control unit. The switch operates to receive tactile input from a driver or related user, while the MID is arranged to provide a first visual indicia in the form of an image on the screen of the MID where numerous icons are arranged. Each of the icons represent a single vehicle system. Importantly, the operation of the HMI allows information corresponding to each of the corresponding vehicle systems to be selectively accessible for viewing and (if necessary) adjustment, manipulation or related control by a driver of a vehicle. The construction of the control unit (including the control logic in the form of algorithmic software loaded into the memory or user interface thereof) is such that a driver's ability to identify and navigate between the various icons on the display is enhanced. In particular, the control unit includes a first control logic portion that enhances the navigation by providing indicia of the operational status (more particularly, whether the system is turned on or turned off) of the vehicle systems that correspond to the displayed icons on the screen during such navigation. A second control logic portion enhances the navigation by providing highlighting indicia for a particular one of the displayed icons on the screen. A third control logic portion enhances the navigation by selectively providing, upon receipt of a respective first command from the switch, a change in operational status of the vehicle system of interest. Likewise, a fourth control logic portion enhances the navigation by selectively providing, upon receipt of a respective second command from the switch that is different from the first command, one or more customization options for the vehicle system of interest; evidence of this customization option is seen by a second visual indicia on the display that replaces the first visual indicia, at least until a signal is received (from either the driver via the switch, or after a set amount of time as determined by the control unit to cease such customization activities.

In yet another embodiment, a method of providing vehicle system information on an MID is disclosed. The method includes arranging a switch and a control unit to be signal communication with each other and the MID. In addition, the method includes providing first visual indicia on the MID, such indicia being in the form of numerous icons each of which are representative of a corresponding vehicle system, and then conveying, upon receipt of a tactile input from the switch, a command to the control unit such that control logic sends instructions to adjust at least a portion of the first visual indicia by navigating between the various icons on the MID. The screen navigation is facilitated through the control logic various portions of which include (a) having a first portion provide indicia of the operational status of the vehicle systems that correspond to the displayed icons on the screen, (b) having a second portion provide highlighting indicia for a particular one of the displayed icons on the screen that corresponds to a respective various vehicle system, (c) having a third portion provide, upon receipt of a respective first command from the switch, a change in operational status of the vehicle system that corresponds to the displayed icon with the highlighting indicia and (d) having a fourth portion provide, upon receipt of a respective second command from the switch that is different from the first command, at least one customization option for the vehicle system that corresponds to the displayed icon with the highlighting indicia, the customization option being evidenced by a second visual indicia on the display that replaces the first visual indicia for at least the duration of time associated with such customization.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein include changing the way soft switches are displayed that maintains all of the information access and display features of a conventional MID design while freeing up precious space on the screen itself. The present invention is beneficial in that by selectively displaying instructional and related information only on an as-needed basis, screen space that otherwise would be unavailable is made available. As such, an MID or related display with a limited-size screen such as those useable in a vehicular instrument cluster or panel would only need to show icons representative of a single or small number of associated functions, thereby reducing a driver's visual and cognitive load. In particular, by removing permanent identifiers associated with a particular menu or sub-menu, as well as having the background of a particular or icon toggle between different colors to indicate its particular feature is turned on or off, the present invention allows more icons to be consolidated into a single, easy-to-access location within the MID. By way of example, FIG. 2 below shows a MID screen corresponding to a vehicle's average fuel economy, projected remaining range and odometer setting, along with various icons that provide a gateway to a more detailed presentation of automotive systems or functions that may be displayed or customized.

Figure 1:
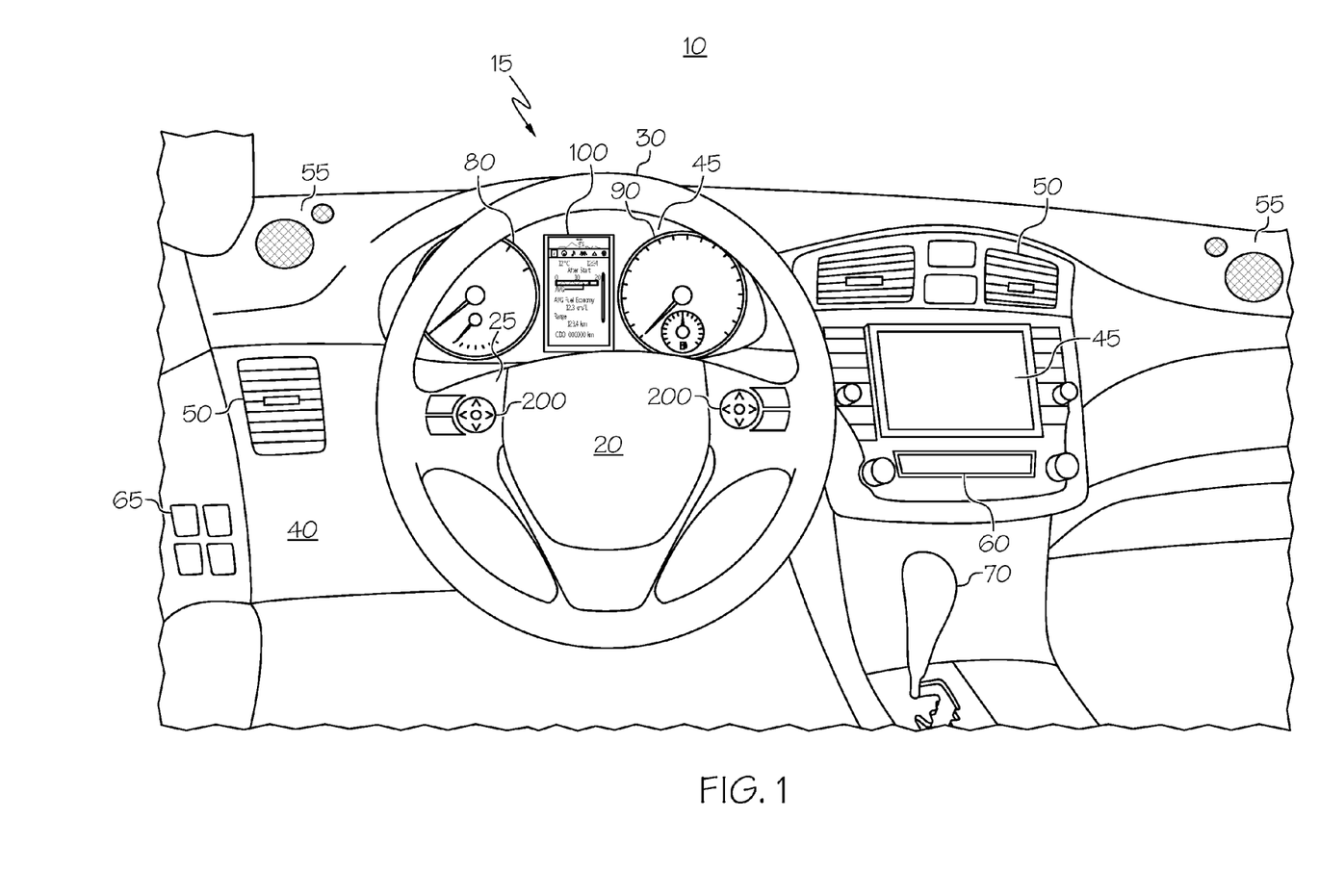
FIG. 1 depicts a driver's view of a dashboard within a vehicular passenger compartment showing placement of the MID within an instrument cluster on the dashboard that may be used in accordance with one or more embodiments shown or described herein.

Referring first to FIG. 1, the driver's portion of a vehicle passenger compartment 10 is shown. In particular, a steering wheel 15 includes a central hub 20, various radial spokes 25 and a peripheral rim 30. As is commonly understood, the steering wheel 15 is designed to rotate about a steering axis in response to driver-initiated turning commands as a way to control the direction the vehicle. In addition to the steering wheel 15, a dashboard 40 is situated within the passenger compartment 10 and is used to house various instrument clusters 45, heating, ventilation and air conditioning (HVAC) outlets 50, audio speakers 55, radio or related sound system 60, toggle switches 65, gear shifter or selector 70 and other driver or passenger interfaces that are commonly associated with vehicle operability. By way of example, one of the instrument clusters 45 can be centrally located within the passenger compartment 10 for use as a main display to provide a map, clock, compass, radio station list, as well as various other messages commonly associated with a vehicular telematics unit or related infotainment system.

Figure 2:
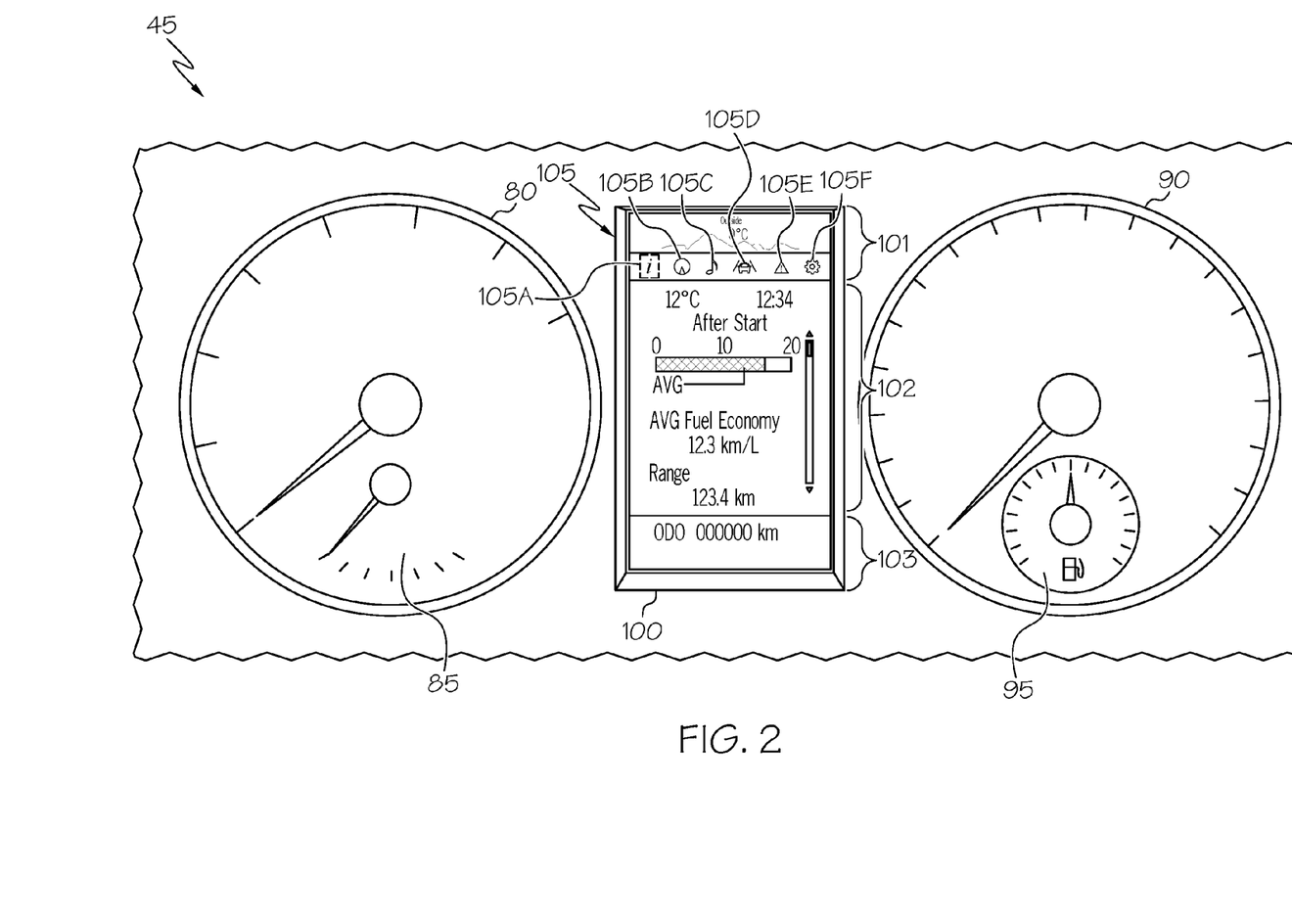
FIG. 2 depicts a detail view of one of the instrument clusters of the dashboard of FIG. 1 that shows with particularity a notional MID screen according to one or more embodiments shown or described herein.

Referring next to FIG. 2, another of the instrument clusters 45 is arranged to be substantially collinear with the turning axis of the steering wheel 15 so that it is particularly within the driver's field of view. This instrument cluster 45 includes various gauges, lights and associated indicators, many of which provide visual indicia of an operational status of the vehicle. Examples of such gauges may include a speedometer 80, a coolant temperature gauge 85 (which may be subsumed within a facial area defined by the speedometer 80), a tachometer 90 and a fuel gauge 95 (which likewise may be subsumed within a facial area defined by the tachometer 90), all arranged for ease of view to the driver. Other gauges, such as, oil pressure gauge, oil temperature gauge, alternator/voltage gauge or the like may also be included in this instrument cluster 45.

More particularly, a MID 100 is disposed between the speedometer 80 and tachometer 90 such that it is directly in front of the driver's eyes. In one form, the MID 100 is a thin-film transistor (TFT) form of the liquid crystal display (LCD), with a rectangular profile or shape that is between about two inches wide and about four inches tall in one form and between about three inches wide and about five inches tall in another form. In one, the screen is visually broken up into an upper portion 101 that can be used to top-level details associated with a vehicular system or function, as well as other information, a larger middle portion 102 to show various items in dynamic graphical format, and a lower portion 103 to show other frequently-viewed pieces of information.

In one non-limiting form, the top-level details depicted in upper portion 101 can include tabs 105 that correspond to broad categories on vehicle system information. Within the present context, the tabs are the functional equivalent of the icons, including having the same GUI-like accessibility. By way of example, various tabs 105A through 105F may represent driver information 105A (which may include a menu that provides information about vehicular systems or functions pertaining to fuel consumption, average speed, economy modes of operation, tire inflation values, gear selection, all-wheel drive control, odometer and trip odometer settings, driving elapsed time or the like), compass 105B (which may include a menu that provides information about vehicular systems or functions pertaining to maps, route guidance or related navigational information), audio (or audio/video) system 105C (which may include a menu that provides information about vehicular systems or functions pertaining to radio stations, multimedia inputs, CDs, DVDs or other on-board audio/video file storage, as well as external or auxiliary devices that contain audio or video files, low-power wireless options such as Bluetooth), driver assist 105D (which may include a menu that provides information about vehicular systems or functions pertaining to lane departure, dynamic radar cruise control or pre-collision warning information), vehicle system warnings 105E (which may include a menu that provides information about vehicular systems or functions pertaining to diagnostic information that may in turn act in response to sensor-acquired data) and settings 105F (which may include a menu that provides information about vehicular systems or functions pertaining to climate control, language, time/date, steering control, parking assist, blind-spot warning or other customizable information). It will be understood that the various menus that are subsumed under the tabs 105A through 105F are preferably provided for sequential display on MID 100 in a hierarchical structure. In this way, more general (i.e., top-level) information about a selected vehicle system or function that correlates to the tabs 105A through 105F may be considered a main menu (i.e., "home" page), while one or more menus and sub-menus from screens under each tab 105A through 105F preferably provide increasing levels of detail associated with such system or function. It will be appreciated that the number of tabs 105 presently depicted is by way of example rather than limitation, and that greater or fewer number may be displayed, depending on the needs of the vehicle. Likewise, it will be appreciated that the organization of the various vehicle systems or functions discussed herein may be grouped under different icons and in a different manner than that mentioned above, and that such groupings may differ by vehicle make, model, trim package or other means, and that all such grouping or display variants are deemed to be within the scope of the present disclosure.

Preferably, the MID 100 screen is always in an "on" position when the vehicle is operating. Thus, in one particular mode of operation (not shown), an initial default screen may be initially illuminated upon vehicle startup, and may be made to remain on for a set amount of time (for example, a few seconds) or can be made to be illuminated until some action is undertaken by the driver, such as pressing a switch or placing the car into a different gear. In such an embodiment, the default screen can then be replaced by either the screen of FIG. 2, or another suitable screen containing numerous icons that correspond to the various vehicle systems being monitored, examples of which will be shown in more detail in conjunction with FIGS. 4A through 4E below.

Figure 3:
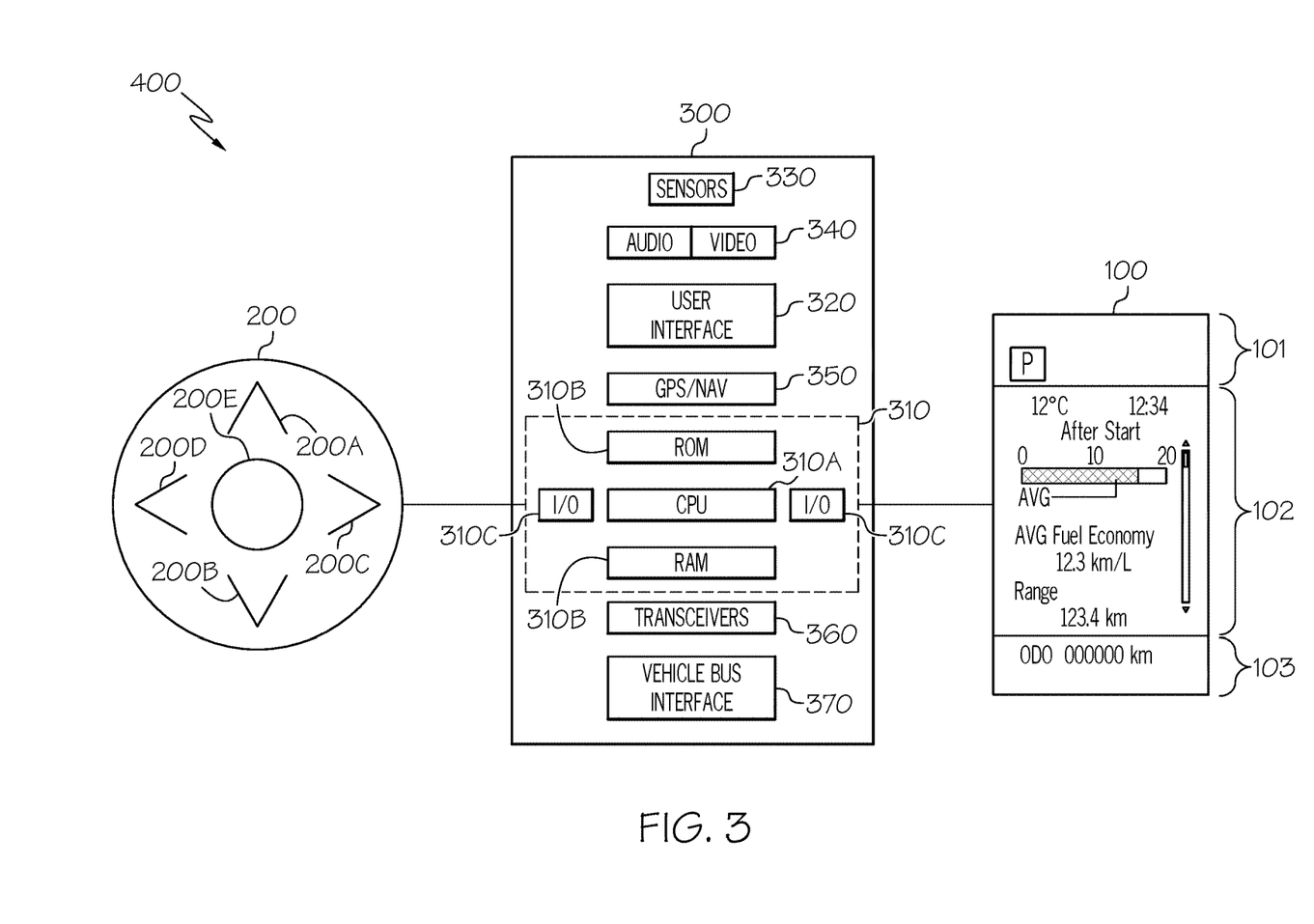
FIG. 3 depicts a block diagram of a vehicular HMI according to one or more embodiments shown or described herein.

Referring next to FIG. 3, a schematic representation showing cooperation between the input device 200, MID 100 and control unit 300 is shown, where together, these three components define the HMI 400. Together, they define an information and control system for selective viewing and adjustment of one or more vehicular systems such as audio/video, navigation, climate control, maintenance, performance, safety systems or the like. In one form, HMI 400 resembles a computer connected to an input for receiving driver instructions such that an output of such instructions, as well as a status of the selected vehicular system or function, can be viewed by the driver, passenger or other occupant of the vehicle. The control unit 300 includes control logic (such as that stored in memory in the form of user interface software or the like) to permit the conveyance of such system information through numerous sequential and interactive menus and sub-menus that will be displayed on MID 100. As will be understood, the hierarchical structure of the various menus and sub-menus is preferably based on levels of system specificity, where the level closest to the top-most (i.e., default) screen tends to present system information in a more general manner, while the levels that correspond to one or more layers of menus or sub-menus tend to present system information in a more detailed manner.

MID 100 may be accessed in one form by various buttons or switches 200. One preferred form of switch 200 is as a four-way switch as shown, which includes various navigational buttons 200A through 200D that may correspond to up, down, right and left directional arrows that are placed peripherally around a central button 200E that operates to provide an ENTER, ACCEPT or OK command (all of which are deemed to be the functional equivalents of one another for the purpose of manipulating one or more icons) in order to select a feature associated with a highlighted icon, tab or related GUI image. Other switches may be populated with dedicated (i.e., pre-set) menu selections rather than situation-dependent directional arrows, and both the dedicated and situation-dependent functional attributes of such switches may be disposed in numerous locations within the passenger compartment 10 in general or on the steering wheel 15 in particular. Switch 200 acts as a manual input device that is responsive to tactile input from a driver (not shown), such as through the use of the driver's thumb or related digit. The switch 200 allows the driver to send commands to the control unit 300 for the purpose of changing the information data on MID 100. Thus, the switch 200 can be used to navigate through multiple, sequential, interactive menu interfaces, as well as initiate vehicle system changes in response to tactile input from the driver.

Switch 200 allows the driver to make a selection that corresponds to a particular tab 105 menu or sub-menu to navigate MID 100, as well as to decide which icon, menu or sub-menu is being displayed at any given time. The directional buttons 200A through 200D correspond generally to compass points north, south, east and west in order to create in the driver's mind a mental image of whether a particular tactile input is meant to selectively highlight (through for example a moving cursor, not shown) a suitable icon on the left, right, up or down position in a rectangular gridded arrangement of the icons on MID 100. Ergonomically, the directional buttons 200A through 200D can be arranged in generally equal radial and circumferential increments about axis defined by central button 200E, thus establishing four quadrants that correspond to familiar north, south, east and west compass or navigational points. By pressing down in a tilting manner in a mutually-independent manner on one of the buttons on switch 200, selective circuit contact is completed for electrical detection of the corresponding driver-initiated input signal. Although not shown, various forms of contacts may be established, including electrical contact-based, spring-based or capacitance-based. Regardless of the construction, a switch signal generated by the steering wheel switch 200 is sent to the control unit 300 for processing and consequent instructions to MID 100.

In one form, the control unit 300 is configured to operate as a computer or related electronic control unit (ECU) such that it forms the central component through which most or all of the components of the HMI 400 interact. In one such form, control unit 300 may be configured with well-known von Neumann computer system architecture attributes to enable it to perform one or more specific automated steps outlined in this disclosure. For example, control unit 300 preferably includes a computer 310 made up of processor 310A, memory 310B and input and output 310C. These various components are presently depicted as being signally-coupled function blocks that are shown separately for illustration purposes, although it will be appreciated that these blocks may also be structurally configured to define one or more components in or around the processor 310A such that they are a part of the internal functioning of the processor 310A itself. For example, in one form, the control unit 300 may be constructed as a microcontroller where the processor 310A, memory 310B, input and output 310C are integrally formed on a single chip. With the inclusion of appropriate logic such as that contained as part of the user interface 320 (which may or may not be stored in memory 310B, depending on the way the logic is structured), the control unit 300 may be programmed to provide various control functions as is known in the art. In one form, memory 310B for the storage of software and gathered data may include static memory such as read-only memory (ROM) and dynamic memory such as random access memory (RAM) and their variants. As such, the use of the control unit 300 in the manner set forth herein permits it to become a particularly-adapted computer or computer-related data processing device for performing at least some of the HMI 400 control discussed herein. It will be appreciated by those skilled in the art that computer-executable instructions that embody operations discussed elsewhere in this disclosure can be placed within an appropriate location (such as the aforementioned memory 310B) within control unit 300 in order to achieve the objectives set forth in the present disclosure.

Additional components are also placed in cooperation with the computer 310 in order to facilitate operation of control unit 300; these may include sensors 330, audio/video files 340, GPS/navigational equipment 350, one or more transceivers 360 to facilitate wireless communication between the vehicle and external telecommunications infrastructure, and a bus interface 370 to establish wiring or related signal communication within a controller area network (CAN, not shown) bus. By the appropriate choice of cursor movement algorithms such as those known to those skilled in the art, control unit 300 may through processor-based operation on those algorithms control a movement of the cursor on MID 100 in response to the signals that are output from the switch 200. In one form, such algorithms may be stored in memory, either as control logic, or as part of a lookup table such that they provide operating instructions to at least one of the control unit 300 and MID 100.

Referring next to FIGS. 4A through 4E, various examples of screen images are portrayed that correspond to some of the accessible and customizable vehicular systems or functions that can be displayed on MID 100. As before with the screen shown in FIG. 2, in one preferred form, the upper portion 101 of each screen can be used to provide dynamic indicia, such as a title of the particular icon being highlighted, while the larger middle portion 102 can be used to show the icons in gridded (i.e., matrix) graphical format where each of the icons is also shown in dynamic format, based in part on which icon is being highlighted at any given time by the directional arrows of buttons 200A through 200D, and the lower portion 103 used to provide instructional information, a particular function (such as the vehicle odometer, as shown) or the like.

In one form, the screen of MID 100 is populated with numerous icons 102A through 102G (although more, including up to sixteen for a roughly 2 inch-by-4 inch rectangular MID 100 are possible) arranged in a matrix or array for easy up, down, right and left navigation between them through the use of the corresponding directional-arrow buttons 200A through 200D that are shown in FIG. 2. Significantly, the icons 102A through 102G are made to be dynamically-adjustable through the cooperative action of the MID 100, switch 200 and control unit 300 of the HMI 400. The first three images shown in FIGS. 4A through 4C that correspond to screens 100A, 100B and 100C each show how the various icons 102A through 102G can be arranged in a whole or partial matrix. Because the directional arrows associated with buttons 200A through 200D are preferably aligned in one of four compass directions, the use of such gridded arrangement of the icons 102A through 102G as shown in FIGS. 4A through 4E is particularly appropriate in that such arrangement intuitively correlates with the tactile input that corresponds to the directional arrows. In addition, instructional information pertaining to central button 200E ENTER/ACCEPT/OK commands is shown in lower portion 103; this button may be used to either return to a higher-level menu or sub-menu when instantly clicked or a lower-level menu when the click is more protracted (i.e., held).

Figure 4A:
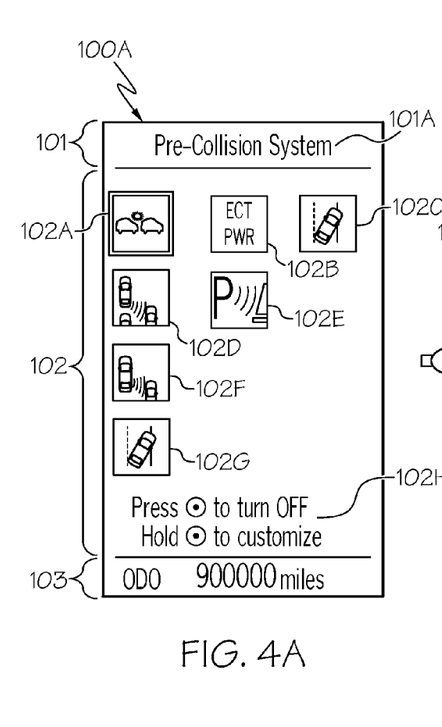
FIGS. 4A through 4E depict a sequence of MID screens that can be sequentially accessed through driver tactile input according to one or more embodiments shown or described herein.
Figure 4B:
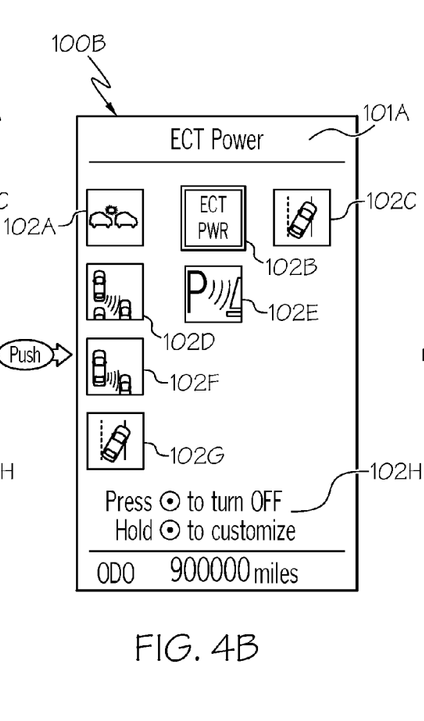
Figure 4C:
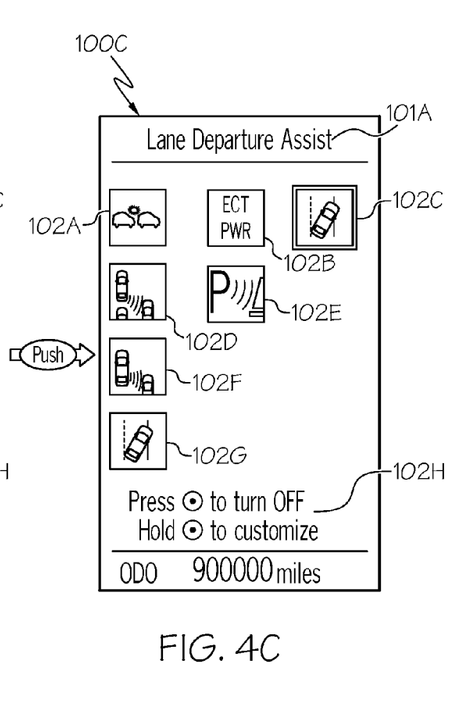

Regarding the icon navigational features as an example, a first part of the control logic may be configured to impart indicia one or more of the icons 102A through 102G to signify the operational status of the corresponding vehicular system. In the present context, the operational status is preferably associated with whether the vehicular system is turned on (i.e., operational) or off (i.e., not operational), although other forms of operational status, such as that associated with diagnostics to determine if such system is operating correctly, may also be similarly associated. In one form such operational status may be configured to have a certain colored background in the space associated with the icon if the system is presently operational, and to have a different colored background in the space associated with the icon if the system is presently not operational. As such, indicia of the operational status of a system corresponding to a particular icon comprises illuminating at least a portion of the icon with a predetermined color. By way of non-limiting example, each icon 102A through 102G could have a green-colored background to indicate that the corresponding system is turned on, and to have a white-colored background when the corresponding system is turned off. In a similar manner, temporary placement (i.e., hovering) of a cursor over a particular icon (in this case, Pre-Collision System 102A) provides the user with the desired information, instructions or options associated with that particular icon, including the title or name of the vehicle system, as shown in the upper portion of screen 100A. Screens 100B and 100C display similar information for the ECT Power System that corresponds to icon 102B and the Lane Departure Assist System that corresponds to icon 102C. Directional arrow navigational movement may be achieved between any of the icons 102A through 102G, while toggling between having the corresponding systems be turned on or off can be achieved by providing instant clicking or related depressing-like engagement of the central button 200E while hovering over the applicable icon. For example, if the Pre-Collision System icon 102A is indicated with a green background (which may be indicative of the system being operational), a brief pressing of the central button 200E can turn the system off (as indicated in the instructions in the lower portion 103 of screen 100A).

Figure 4D:
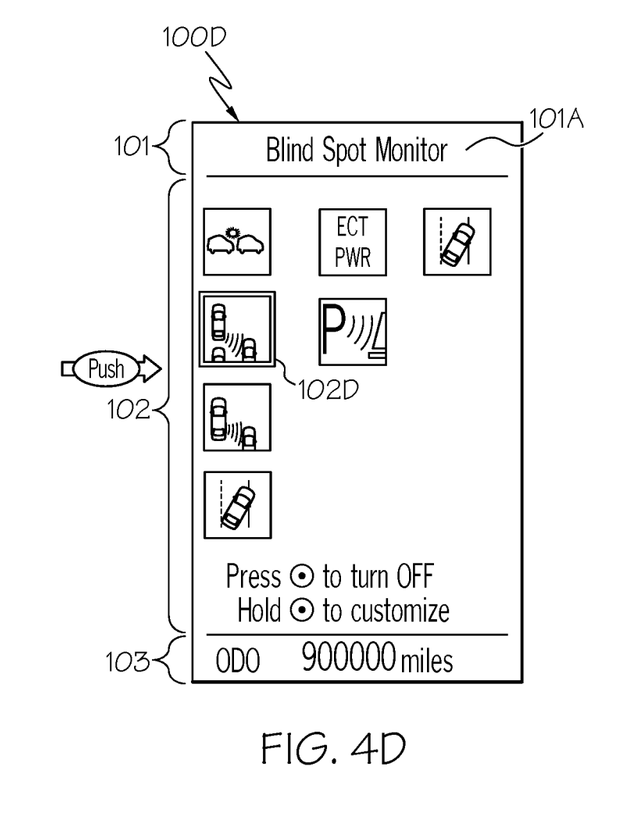
Figure 4E:
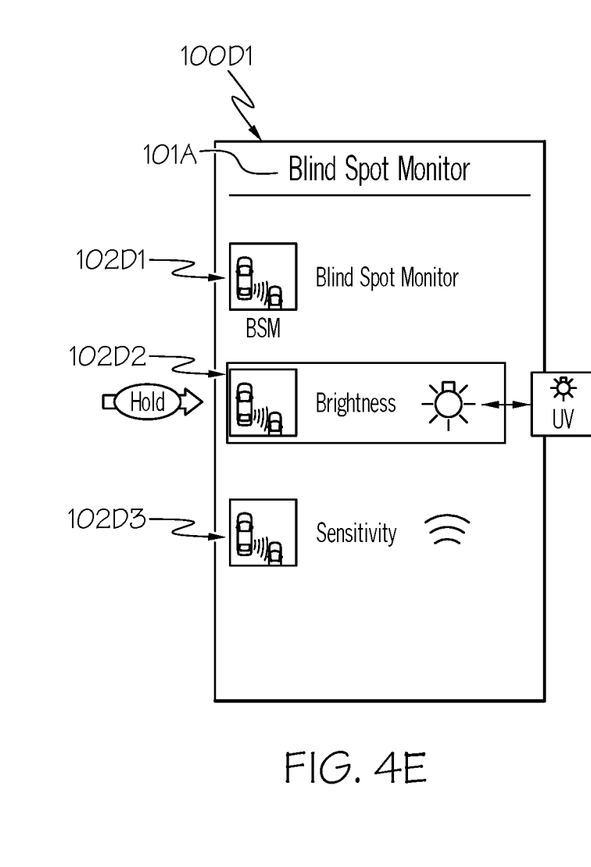

As also shown in the instructions in the lower portion 103 of screen 100A (and comparably repeated in parallel screens 100B and 100C), hierarchical movement in order to customize features associated with a particular may be achieved through a protracted tactile entry of the central button 200E. Referring with particularity to FIGS. 4D and 4E, they sequentially show with particularity that varying hierarchical levels associated with engaging central button 200E in the manner depicted in the lower portion 103 of screens 100D and 100D1 may be navigated with HMI 400. Using the Blind Spot Monitor system (which is associated with icon 102D) as an example, when the user scrolls to the appropriate menu the indicia of which is notoriously presented by way of a corresponding title 101A in the upper portion 101 of screen 100D, he or she will be able to hover over a representative icon 102D that depicts in simple graphical form a symbol that corresponds to the title being shown in the upper portion 101. This hovering will trigger the icon 102D to be highlighted, such as by a different color, shape or related detail to a frame formed around the rectangular image of the icon 102D as shown. Likewise, such hovering will in turn cause the system name shown at the upper portion 101 of screen 100D to temporarily displace the previous title that was associated with the previous icon that was hovered upon. This selective displacement lasts only as long as the hovering takes place. This, as well as the instructional information such as shown at the lower portion 103, may be made to only be present when needed. By making such icon-specific graphics temporary, the space taken up by them on the MID 100 may be hidden when not needed, thereby freeing up more of the screen 100D such that more soft switch icons (up to a reasonable limit of sixteen four a 2-inch by 4-inch screen) may be placed on the MID 100.

Although there are two screen levels shown in FIGS. 4D and 4E, it will be appreciated that additional numbers of such screens may be used, depending on the need. In particular, it is envisioned that as the number of vehicular systems and their parameters that can be monitored and controlled increases, the number of sub-menus subsumed under the screen of either of these two figures can be increased to accommodate system complexity, and that such greater number of additional levels is within the scope of the present disclosure.

Figure 5A:
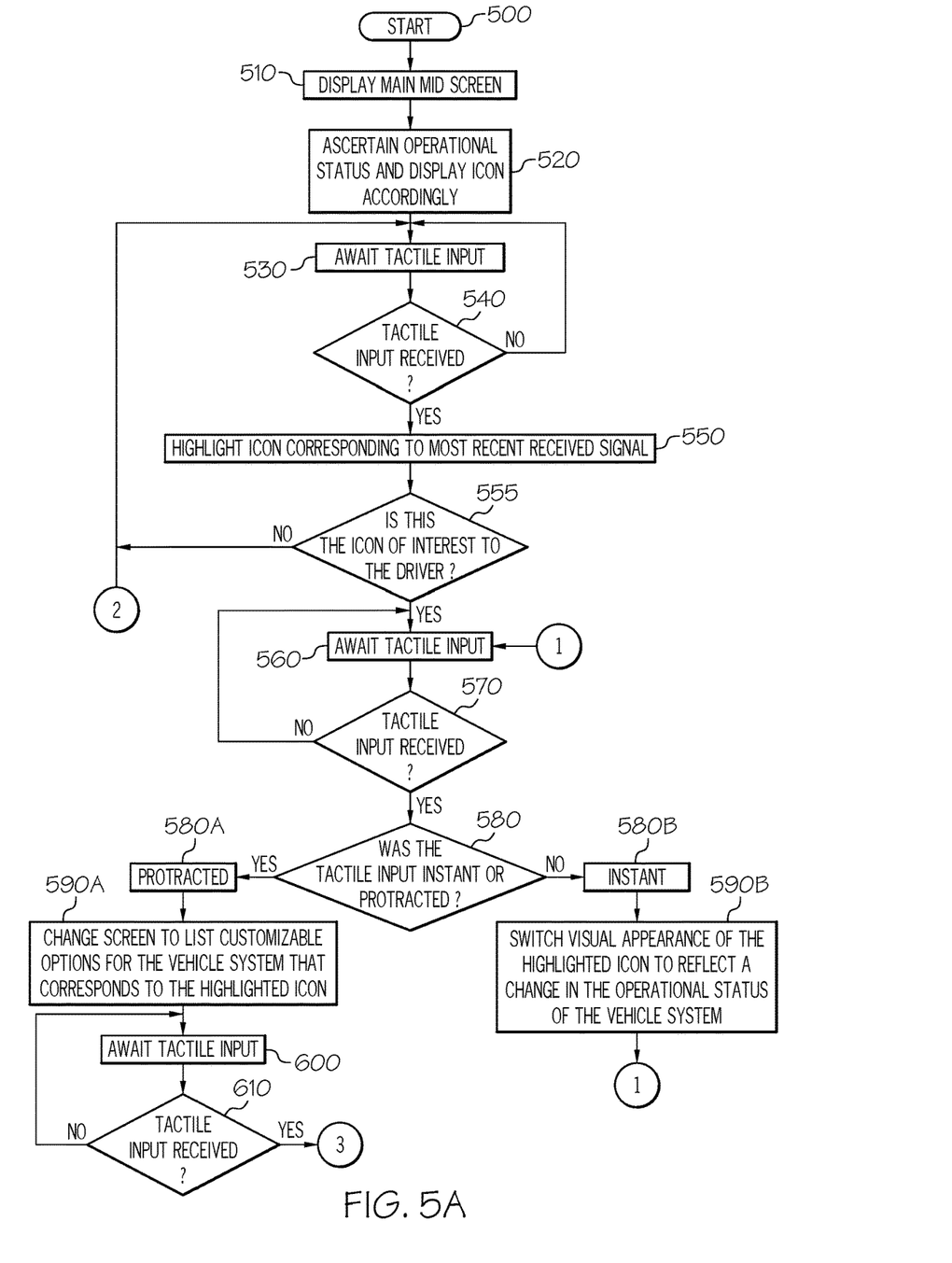
FIGS. 5A and 5B depict a flowchart illustrating the cooperation between driver input and a displayed image on the MID to present and adjust vehicle system information on the MID according to one or more embodiments shown or described herein.
Figure 5B:
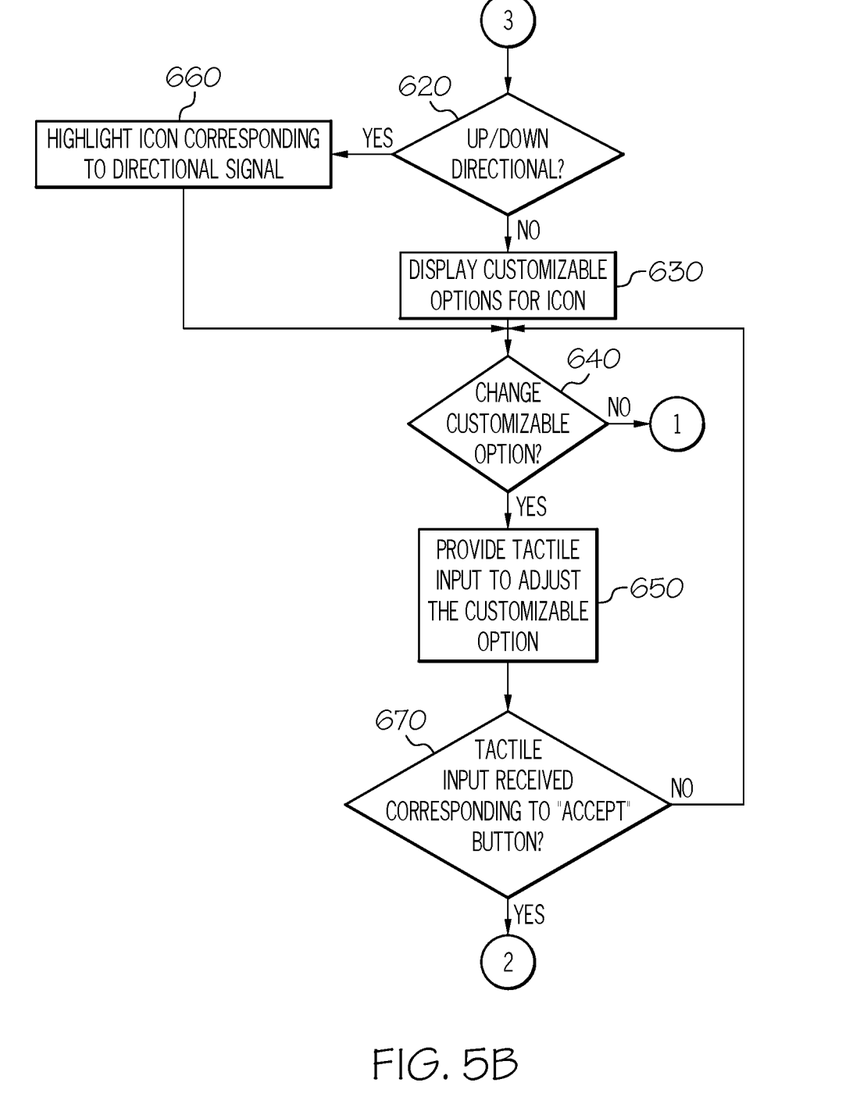

Referring next to FIGS. 5A and 5B, a flowchart depicting the algorithmic procession of some of the portions of the control logic that is loaded, embedded or otherwise signally cooperative with the processor 310A of control unit 300 is shown, using as an example the various images from FIGS. 4A through 4E that can be displayed on MID 100. In the present context, it will be appreciated that the control logic may be voluminous, including potentially thousands of lines of code, including numerous routines and subroutines that can be accessed by and acted upon by the control unit 300 computer 310 in general and the CPU or processor 310A in particular. Nevertheless, the discussion below focuses on only four portions of such control logic as being the ones most relevant to the operation of the HMI 400, the remaining portions being understood by those skilled in the control unit art.

Upon startup of the vehicle and corresponding initiation of MID 100 at step 500, the control unit 300 initiates a sequence of instructions that cause the screen of MID 100 to illuminate at step 510. In one form, this screen with the matrix of icons 102A through 102G can be formed as a default screen, while in another it can be formed as menu that is arrived at as a first descending level underneath another screen (such as that depicted at the upper portion 101 of the MID 100 of FIG. 2 that shows a set of tabs 105A through 105F that are used to provide grouping for certain automotive systems or functions). At step 520, the control logic (specifically, a first portion thereof) ascertains the operational status of each of icons 102A through 102G (such as through input from a sensor, controller or the like) and provides a control signal to the MID 100 to instruct it to illuminate the respective icons in a particular manner commensurate with each system's operational status. For example, in one form as previously mentioned, such indicia may be in the form of providing differing color schemes or the like on, around or behind the icon. After that, the logic then proceeds to steps 530 and 540 to await tactile input from the driver via switch 200. At step 540, the logic ascertains whether one of the buttons 200A, 200B, 200C or 200D of switch 200 has been activated by the driver. In the event no such command has been received, the logic remains in a holding or wait status and continues to display the existing screen on MID 100 as depicted at step 530, as well as wait on further instructions. Contrarily, if a command is received, then it proceeds to step 550 to determine if the icon that is presently being hovered over as a result of the directional arrow tactile input is the one of interest to the driver. At step 555, the icon being highlighted on the screen has its image enhanced so that the driver can readily tell which vehicle system can then be viewed with greater particularity, as well as adjusted (if needed). This image enhancement comes in the form of a portion (specifically, a second portion) of the control logic sending a signal to have the MID 100 display the image on the screen that corresponds to such highlighted status. As mentioned above, and by way of a non-limiting example, a vibrantly-colored frame (such as yellow in situations where the screen background is a dark color like blue or black) may be placed around the icon to indicate its highlighted status. After that, the logic waits for suitable tactile input at steps 560 and 570 in the form of pushed central button 200E, either in an instant (i.e., clicking) manner or a protracted (i.e., click and hold) manner. At this time, the present image remains on the screen on MID 100 as depicted at step 560 until such time as a new signal is received. As mentioned above, while a particular icon is being highlighted (such as icon 102C in FIG. 4C) by having a cursor hover over it, indicia of such icon and its corresponding vehicle system remain displayed so that the driver is cognizant of which system or feature he or she is able to access. At step 580, the logic ascertains whether the driver was interested in manipulating at least one parameter associated with the system of the highlighted icon, and if not to go into a waiting or holding status to await at step 560 further tactile input from switch 200. Contrarily, if the control logic determines that tactile input is received, it then ascertains at steps 580A or 580B whether the input correlates to the protracted or instant activation of central button 200E. For input that indicates that the protracted option was selected, step 590A then has a portion of the control logic (specifically, a fourth portion) instruct the display to change images such that a screen depicting a list of customizable options (such as that associated with screen 100D1 of FIG. 4E) is presented. After changing the screen in step 590A, the logic control instructs the HMI 400 to await tactile input at step 600 in a manner similar to steps 530 and 560. Contrarily, for input that indicates that the instant option was selected, step 590B then has a portion of the control logic (specifically, a third portion) instruct the display to change operational status of the underlying vehicle system (for example, going from being turned on to turned off and vice versa). In the former scenario associated with the protracted use of button 200E and the concomitant desire to adjust one or more customizable features, steps 610 and 620 then ascertain whether additional tactile input has been received, and if so, in what form. For example, if it is desired to customize or otherwise adjust other vehicle systems, steps 630 and 650 can be sequentially carried out to perform such additional customization, while step 640 gives the option to cancel the customization request and return to a previous level (such as that indicated at step 560) in order to permit the driver to contemplate another one of the icons 102A through 102G. In one form, the first command from the switch 200 involves an instant tactile engagement of central button 200E, while the second command from the switch that corresponds to customization of the relevant vehicular system involves a protracted tactile engagement of the same central button 200E. Within the present context, an instant tactile engagement is that associated with a conventional clicking depression of a particular button where once the click or related indicia registers in the driver's mind, he or she releases the button. Contrarily, a protracted tactile engagement is that associated with not just a clicking depression of a particular button, but also holding such depression in place for a certain amount of time thereafter such as that associated with a conventional keyboard, where holding a single key down for more than a moment results in repeated entry of the character or feature associated with the key. Once the screen shows the various customizable options (as evidenced by step 590B), if a tactile input corresponding to the up or down directional arrows of buttons 200A or 200B is received from step 610, then at step 650, the icon that corresponds to one of the other customizable choices (such as icons 102D1 or 102D3 as shown in FIG. 4E) becomes highlighted, after which the option to customize the most recent choice can be repeated as often as necessary at steps 630 and 640.

The steps above may be repeated as often as necessary in order to permit the driver to view the status of various vehicle systems, and if necessary adjust their operation, all through HMI 400. Such steps promote ease of MID 100 use by having many (if not substantially all) vehicle system viewing and adjustment functions take place through simple, repeatable tactile input from a single switch 200, thereby reducing a driver's mental workload while operating a vehicle. In situations where the switch 200 is configured as a four-way switch (such as that shown in FIG. 3), the driver's workload becomes even more simplified through the software-based control strategies discussed herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular human-machine interface comprising:
    a switch configured to receive tactile input from a driver of a vehicle;
    a multi-information display situated in a position to be viewed by a driver of a vehicle, the display configured to provide first visual indicia in the form of a plurality of icons presented thereon each of which are representative of a corresponding vehicle system that is selectively accessible for at least one of viewing and control by a driver of a vehicle; and
    a control unit cooperative with the switch and display to facilitate navigation between the plurality of the icons on the display in response to a tactile input from the switch, the control unit comprising:
        control logic that enhances the navigation by providing indicia of the operational status of the vehicle systems that correspond to the displayed icons on the screen;
        control logic that enhances the navigation by providing, during such navigation, highlighting indicia for a particular one of the displayed icons on the screen that corresponds to a respective various vehicle system;
        control logic that enhances the navigation by providing, upon receipt of a respective first command from the switch, a change in operational status of the vehicle system that corresponds to the displayed icon with the highlighting indicia; and
        control logic that enhances the navigation by selectively providing, upon receipt of a respective second command from the switch that is different from the first command, at least one customization option for the vehicle system that corresponds to the displayed icon with the highlighting indicia, the customization option being evidenced by a second visual indicia on the display that replaces the first visual indicia for at least the duration of time associated with such customization.

2. The interface of claim 1, wherein the indicia of the operational status comprises an illumination of at least a portion of the icon with a predetermined color.

3. The interface of claim 2, wherein the predetermined color comprises alternatively a first color to indicate that the respective vehicular feature is operational or a second color to indicate that the respective vehicular feature is not operational, the second color being different from the first color.

4. The interface of claim 2, wherein the illumination is present on all of the displayed icons.

5. The interface of claim 1, wherein the highlighting indicia only remains on that particular icon until tactile input from a driver of a vehicle instructs the switch to provide a command for the control unit to cause the highlighting indicia to move to another icon.

6. The interface of claim 1, wherein the display defines a substantially rectangular profile.

7. The interface of claim 6, wherein the dimensions corresponding to the rectangular profile are a width of no more than about three inches and a height of no more than about five inches.

8. The interface of claim 7, wherein the dimensions corresponding to the rectangular profile are a width of no more than about two inches and a height of no more than about four inches.

9. The interface of claim 1, wherein the first command from the switch comprises an ACCEPT command that corresponds to an instant tactile engagement of a corresponding button on the switch, and the second command from the switch comprises a CUSTOMIZATION command that corresponds to a protracted tactile engagement of the switch.

10. The interface of claim 9, wherein the switch comprises a plurality of buttons thereon such that the first and second commands are each initiated from the same button of the plurality of buttons.

11. A vehicular instrument cluster comprising:
at least one gauge configured to provide visual indicia of an operational status of the vehicle; and
a vehicular human-machine interface comprising:
a switch configured to receive tactile input from a driver of a vehicle;
a multi-information display situated in a position to be viewed by a driver of a vehicle, the display configured to provide first visual indicia in the form of a plurality of icons presented thereon each of which are representative of a corresponding vehicle system that is selectively accessible for at least one of viewing and control by a driver of a vehicle; and
a control unit cooperative with the switch and display to facilitate navigation between the plurality of the icons on the display in response to a tactile input from the switch, the control unit comprising at least a first control logic portion that enhances the navigation by providing indicia of the operational status of the vehicle systems that correspond to the displayed icons on the screen, a second control logic portion that enhances the navigation by providing, during such navigation, highlighting indicia for a particular one of the displayed icons on the screen that corresponds to a respective various vehicle system, a third control logic portion that enhances the navigation by providing, upon receipt of a respective first command from the switch, a change in operational status of the vehicle system that corresponds to the displayed icon with the highlighting indicia, and a fourth control logic portion that enhances the navigation by selectively providing, upon receipt of a respective second command from the switch that is different from the first command, at least one customization option for the vehicle system that corresponds to the displayed icon with the highlighting indicia, the customization option being evidenced by a second visual indicia on the display that replaces the first visual indicia for at least the duration of time associated with such customization.

12. The instrument cluster of claim 11, wherein the display is situated between two of the gauges the first of which comprises at least a speedometer and the second of which comprises at least a tachometer.

13. The instrument cluster of claim 11, wherein the display defines a substantially rectangular profile wherein the dimensions corresponding to the rectangular profile are a width of no more than about three inches and a height of no more than about five inches.

14. The instrument cluster of claim 13, wherein the dimensions corresponding to the rectangular profile are a width of no more than about two inches and a height of no more than about four inches.

15. The instrument cluster of claim 14, wherein the control logic comprises a portion configured to display between twelve and sixteen of the plurality of icons on the display during the first visual indicia.

16. A method of providing vehicle system information on a multi-information display, the method comprising:
arranging a switch and a control unit to be signal communication with each other and the display;
providing, on the display, first visual indicia in the form of a plurality of icons each of which are representative of a corresponding vehicle system;
conveying, upon receipt of a tactile input from the switch, a command to the control unit such that control logic that provides operating instructions to at least one of the control unit and the display sends instructions to adjust at least a portion of the first visual indicia by navigating between the plurality of the icons on the display, the control unit configured to provide such navigating on the screen by:
having a first portion of the control logic provide indicia of the operational status of the vehicle systems that correspond to the displayed icons on the screen;
having a second portion of the control logic provide highlighting indicia for a particular one of the displayed icons on the screen that corresponds to a respective various vehicle system;
having a third portion of the control logic provide, upon receipt of a respective first command from the switch, a change in operational status of the vehicle system that corresponds to the displayed icon with the highlighting indicia; and
having a fourth portion of the control logic provide, upon receipt of a respective second command from the switch that is different from the first command, at least one customization option for the vehicle system that corresponds to the displayed icon with the highlighting indicia, the customization option being evidenced by a second visual indicia on the display that replaces the first visual indicia for at least the duration of time associated with such customization.

17. The method of claim 16, further comprising adjusting at least one operational parameter within the corresponding vehicle system with the fourth portion of the control logic.

18. The method of claim 16, wherein the control logic comprises a portion configured to display between twelve and sixteen of the plurality of icons on the display during the first visual indicia.

19. The method of claim 16, wherein the first command from the switch comprises an ACCEPT command that a first tactile engagement of a corresponding button on the switch, and the second command from the switch comprises a CUSTOMIZATION command that corresponds to a second tactile engagement of the switch.

20. The method of claim 19, wherein the switch comprises a plurality of buttons thereon such that the first and second commands are each initiated from the same button of the plurality of buttons, the first command corresponding to an instant tactile engagement of the button, and the second command corresponding to a protracted tactile engagement of the button.

* * * * *